United States Patent
Smith et al.

(10) Patent No.: US 9,068,869 B2
(45) Date of Patent: Jun. 30, 2015

(54) MAGNETIC FLOWMETER WITH BONDED PTFE ELECTRODES

(71) Applicant: Rosemount Inc., Chanhassen, MN (US)

(72) Inventors: Joseph Alan Smith, Minneapolis, MN (US); Stephen Richard Yingst, Golden Valley, MN (US); Nelson Mauricio Morales, Lakeville, MN (US)

(73) Assignee: Rosemount Inc., Shakopee, MN (US)

( * ) Notice: Subject to any disclaimer, the term of this patent is extended or adjusted under 35 U.S.C. 154(b) by 159 days.

(21) Appl. No.: 13/826,793

(22) Filed: Mar. 14, 2013

(65) Prior Publication Data

US 2014/0260661 A1 Sep. 18, 2014

(51) Int. Cl.
*G01F 1/58* (2006.01)

(52) U.S. Cl.
CPC ..................................... *G01F 1/584* (2013.01)

(58) Field of Classification Search
CPC ............. G01F 1/58; G01L 9/00; G01N 27/26
USPC .................. 73/861.12; 257/419; 204/667, 400
See application file for complete search history.

(56) References Cited

U.S. PATENT DOCUMENTS

| | | | | |
|---|---|---|---|---|
| 3,211,638 | A * | 10/1965 | Halvorsen | 204/415 |
| 4,545,887 | A * | 10/1985 | Arnesen et al. | 204/667 |
| 4,882,029 | A * | 11/1989 | Eickmann | 204/400 |
| 5,708,213 | A * | 1/1998 | Batey | 73/861.12 |
| 6,178,826 | B1 * | 1/2001 | Graf et al. | 73/861.12 |
| 6,983,661 | B2 | 1/2006 | Zingg | |
| 7,079,958 | B2 * | 7/2006 | Budmiger et al. | 702/45 |
| 7,135,749 | B2 * | 11/2006 | Sakai et al. | 257/419 |
| 2004/0097145 | A1 * | 5/2004 | Baumann et al. | 439/894 |
| 2006/0150746 | A1 | 7/2006 | Keese et al. | |
| 2006/0162465 | A1 * | 7/2006 | Sulzer et al. | 73/861.12 |
| 2006/0174715 | A1 | 8/2006 | Wehrs et al. | |
| 2007/0193366 | A1 | 8/2007 | Backer et al. | |
| 2010/0024568 | A1 | 2/2010 | Diederichs | |
| 2010/0162827 | A1 * | 7/2010 | Jakobsen | 73/861.12 |
| 2010/0300212 | A1 * | 12/2010 | Kerrom | 73/861.12 |
| 2013/0086993 | A1 * | 4/2013 | Kerrom et al. | 73/861.12 |
| 2014/0251025 | A1 * | 9/2014 | Rogers et al. | 73/861.12 |

FOREIGN PATENT DOCUMENTS

CN 101900583 A 12/2010

OTHER PUBLICATIONS

International Searching Authority, International Search Report and Written Opinion, Sep. 17, 2014, 14 pages.

* cited by examiner

*Primary Examiner* — Jewel V Thompson
(74) *Attorney, Agent, or Firm* — Kinney & Lange, P.A.

(57) ABSTRACT

A magnetic flowmeter includes a pipe with a non-conductive PTFE liner, magnetic coils to generate a magnetic field, and electrodes in contact with the fluid on opposite sides of the pipe. The electrodes comprise conductive PTFE patch electrodes bonded to the non-conductive PTFE liner so that an inner end of each patch electrode is exposed to fluid flowing through the interior pipe and an outer end of each patch electrode is aligned with an electrode hole in the pipe.

20 Claims, 4 Drawing Sheets

MAGNETIC FLOWMETER WITH BONDED PTFE ELECTRODES

BACKGROUND

This invention relates generally to fluid processing, and specifically to process flow measurement and control. In particular, the invention concerns magnetic flowmeters.

Magnetic flowmeters (or mag meters) measure flow by Faraday induction, an electromagnetic effect. The meter energizes a coil (or coils) to generate a magnetic field across a pipe section, and the magnetic field induces an electromotive force (EMF) across the process flow. The flow velocity is proportional to the induced EMF, and the volumetric flow rate is proportional to the flow velocity and flow area.

In general, electromagnetic flow measurement techniques are applicable to water-based fluids, ionic solutions and other conducting liquid flows. Specific uses include water treatment facilities, high-purity pharmaceutical manufacturing, hygienic food and beverage production, and chemical processing, including hazardous and corrosive process flows. Magnetic flowmeters are also employed in the hydrocarbon fuel industry, including hydraulic fracturing techniques utilizing abrasive and corrosive slurries, and in other hydrocarbon extraction and processing methods.

Magnetic flowmeters provide fast, accurate flow measurements in applications where differential pressure-based techniques are disfavored because of the associated pressure drop (for example, across an orifice plate or Venturi tube). Magnetic flowmeters can also be used when it is difficult or impractical to introduce into the process flow a mechanical element, such as turbine rotor, vortex-shedding element or Pitot tube.

A magnetic flowmeter determines a flow rate of a conductive fluid flowing through a conduit or pipe by measuring a voltage generated across the fluid in a direction perpendicular to the fluid flow as the fluid moves through a magnetic field generated by the flowmeter. The voltage is measured between two electrodes that are in contact with the fluid and are positioned on opposite sides of the pipe. The pipe walls must be either electrically non-conductive or, if conductive, have an electrically non-conductive liner to keep from shorting out the voltage generated across the fluid flow. If the pipe wall is conductive, the two electrodes must also be electrically insulated from the pipe wall and must penetrate the non-conductive liner to accurately measure the generated voltage.

The magnetic flowmeter requires electrodes to carry voltage from the process fluid to a transmitter. Some of the key attributes desired by customers with respect to the electrodes are low profile (low noise), low cost, compatibility of materials, coating resistant (non-sticking), and a wide pressure and temperature performance range.

The application of magnetic flowmeters in the oil and gas industry present challenges because the magnetic flowmeter linings and electrodes can be exposed to high pressures. This is particularly the case with polytetrafluoroethylene (PTFE) linings because of the tendency of PTFE to "cold flow", whereby the PTFE lining expands and contracts under pressure and temperature. The result can be that the PTFE liner and the electrodes can separate and process fluid can find leak paths that compromise the electrodes.

SUMMARY

A magnetic flowmeter includes a pipe with a non-conductive PTFE liner on an inner surface of a pipe. Conductive PTFE patch electrodes are bonded to the non-conductive PTFE liner so that an inner end of each electrode is exposed to an interior of the pipe, and an outer end of each electrode is aligned with an electrode hole in the pipe.

A liner and electrode assembly includes first and second conductive patch electrodes bonded to a non-conductive PTFE liner. The inner ends of the patch electrodes match the inner surface contour of the liner.

DETAILED DESCRIPTION

Figure 1:
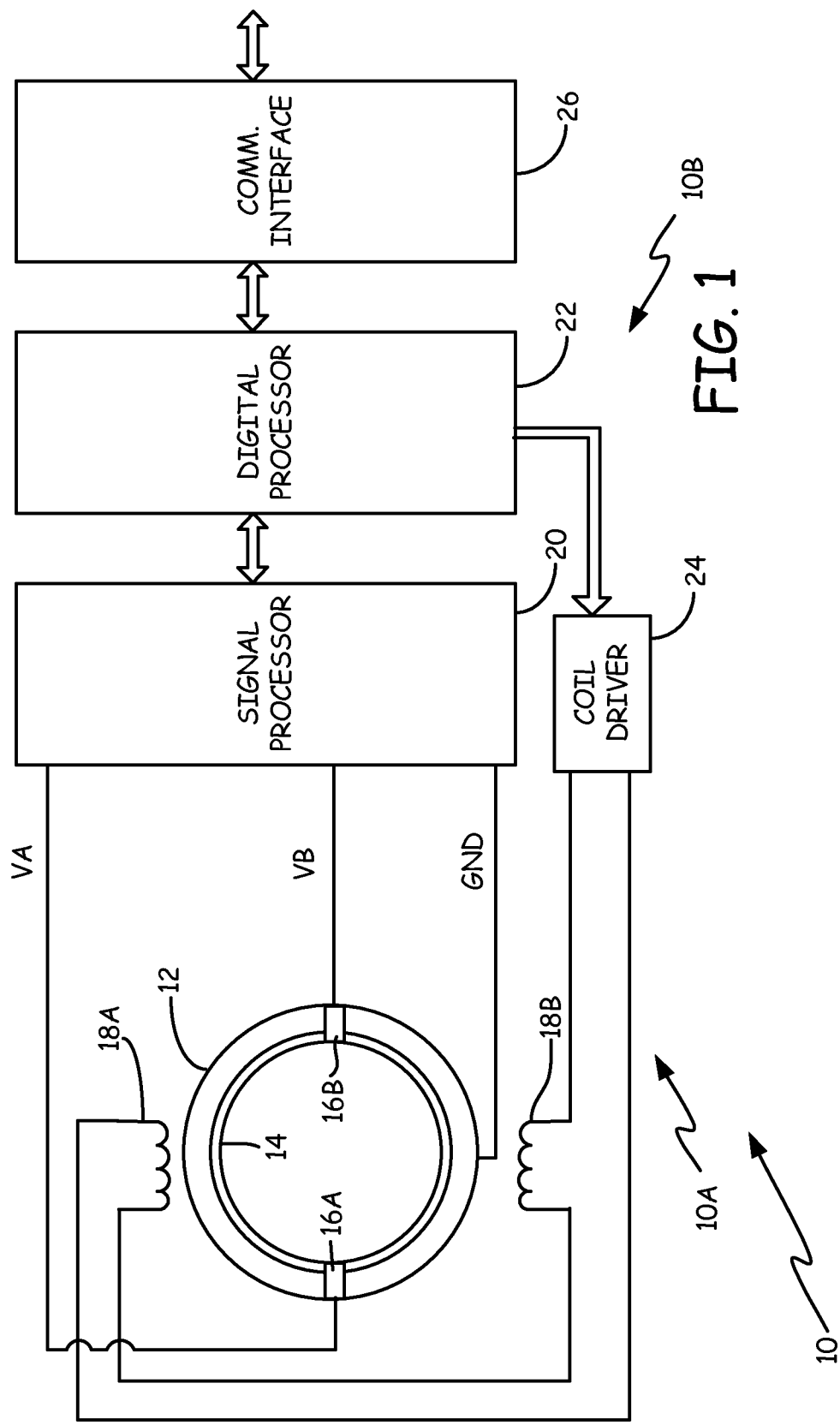
FIG. 1 is a block diagram of a magnetic flowmeter.

FIG. 1 shows magnetic flowmeter 10, which includes primary section (or flow tube) 10A and secondary section (or transmitter) 10B. Flow tube 10A includes pipe 12, insulating liner 14, electrode 16A and 16B, and field coils 18A and 18B.

The primary function of flow tube 10A is to produce a voltage proportional to the velocity of the fluid being measured. Field coils 18A and 18B are energized by passing a current through them to develop the magnetic field. The direction of the coil drive current is reversed periodically so that the magnetic field produced by field coils 18A and 18B changes direction. The process fluid flowing through the interior of flow pipe 10A functions as a moving conductor that induces a voltage in the fluid. The flush mounted electrodes 16A, 16B inside flow tube 10A are in electrical contact with the conductive process fluid, thereby picking up voltages present in the fluid. To prevent the voltage from being shorted, the fluid must be contained in an electrically insulating material. When pipe 12 is a metal tube, the insulation is provided by liner 14, which is a non-conducting material such as polytetrafluoroethylene (PTFE).

Transmitter 10B interprets the voltage generated at electrode 16A and 16B and transmits a standardized signal to a monitoring or control system. Transmitter 10B includes signal processor 20, digital processor 22, coil driver 24, and communication interface 26. Signal conversion, conditioning, and transmission are the principal functions of transmitter 10B.

Coil drive current (which may be AC or pulsed DC) is supplied by coil driver 24 to coils 18A and 18B. The drive current energizes coils 18A and 18B. The drive current energizes coils 18A and 18B to generate a magnetic field across the process flow. The magnetic field induces an EMF which can be sensed by electrodes 16A and 16B. The flow velocity of fluid through flow tube 10A is proportional to the EMF.

Signal processor 20 is connected to electrodes 16A and 16B and to ground. The ground connection may be to pipe 12, or may be to a flange or pipe section upstream or downstream of pipe 12. Signal processor 20 monitors potential VA at electrode 16A and potential VB at electrode 16B. Signal processor 20 produces a voltage representing the difference in potential between electrode 16A and 16B and converts that voltage into a digital signal representing the electrode voltage. Digital processor 22 may perform further signal processing and grooming of the digital signals received from signal processor 20. Digital processor 22 supplies a flow measurement value to communication interface 26, which communicates that value to a monitoring or control system (not shown). The communication by communication interface 26 can be in the form of an analog current level which varies between 4 and 20 mA, a HART® communication protocol in which digital information is modulated upon a 4-20 mA current, a Fieldbus or Profibus communication protocol over a digital bus, or wireless communication over a wireless network using a wireless protocol such as, for example, WirelessHART (IEC 62951).

Polytetrafluoroethylene (PTFE) is a common material choice for liner in a magnetic flowmeter due to its durability and exceptional resistance to chemical attack. When challenged with the use of PTFE lining for magnetic flowmeters is a potential that the liner will shift with respect to the electrodes, which can result in process fluid leaking around the electrodes or result in the electrodes shorting against the walls of the conductive pipe. These issues are particularly challenging with high pressure applications for magnetic flowmeter, such as those required in the oil and gas industry. PTFE expands and contracts under pressure and temperature, and the shifting of the PTFE liner with respect to the electrode assembly can be problematic.

The present invention provides a solution through the use of a conductive PTFE patch electrode that is bonded to a non-conductive PTFE liner. The PTFE patch electrode is doped with carbon particles (graphite) so that the PTFE patch electrode has a resistance of less than 30 Kohms. The conductive PTFE patch electrode can be shaped to mate with a hole in the non-conductive PTFE liner so that the conductive PTFE patch electrode fits snuggly within the hole with its inner end surface patching the inner surface contour of the PTFE liner, and its outer end surface matching the outer surface contour of PTFE liner. The conductive PTFE patch electrode and the non-conductive PTFE liner can be bonded together using PFA as a bonding agent. Together, they form a single polymer flow barrier to a fluid passing through the magnetic flowmeter. The PTFE patch electrode and the PTFE liner are bonded together and move together so that cold flow does not cause a leak.

Figure 2:
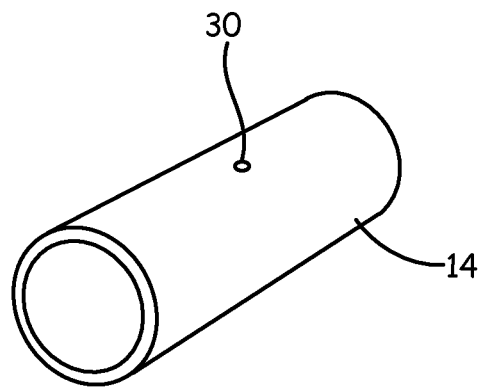
FIG. 2 is a perspective view of a PTFE liner with a conductive PTFE patch electrode.
Figure 3:
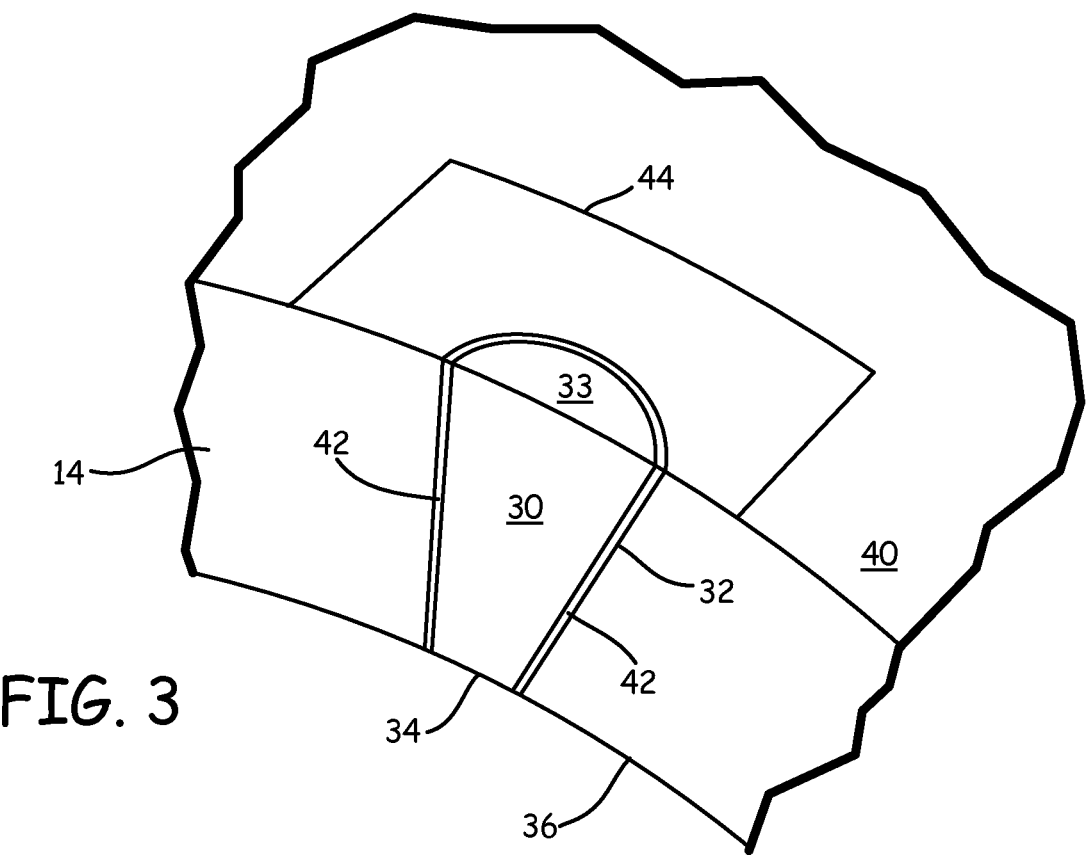
FIG. 3 is a perspective view, in section, of the PTFE liner and conductive PTFE patch electrode of FIG. 2.

FIGS. 2 and 3 illustrate an embodiment as the present invention. In FIG. 2, PTFE patch electrode 30 is shown in non-conductive PTFE liner 14. FIG. 3 shows an enlarged sectional view through liner 14 and patch electrode 30. In this embodiment, patch electrode 30 has a frustoconical shape that mates with tapered hole 32 in liner 14. Inner end 34 of patch electrode 30 is the narrower end, and is flush with inner surface 36 of liner 14. Outer end 38 of patch electrode 30 is flush with outer surface 40 of liner 14. Thin PFA layer 42 lines the wall of hole 32 and acts as a bonding agent between the sidewall of patch electrode 30 and the wall of hole 32.

In this embodiment, a thin layer of PFA covers outer end 38 of patch electrode 30 and a portion of outer surface 30 of liner 14 that surrounds surface 38 of patch electrode 30. Layer 44 acts as an insulating barrier over conductive patch 30, so that patch electrode 30 is not shorted to the conductive inner wall of pipe 12.

Figure 4:
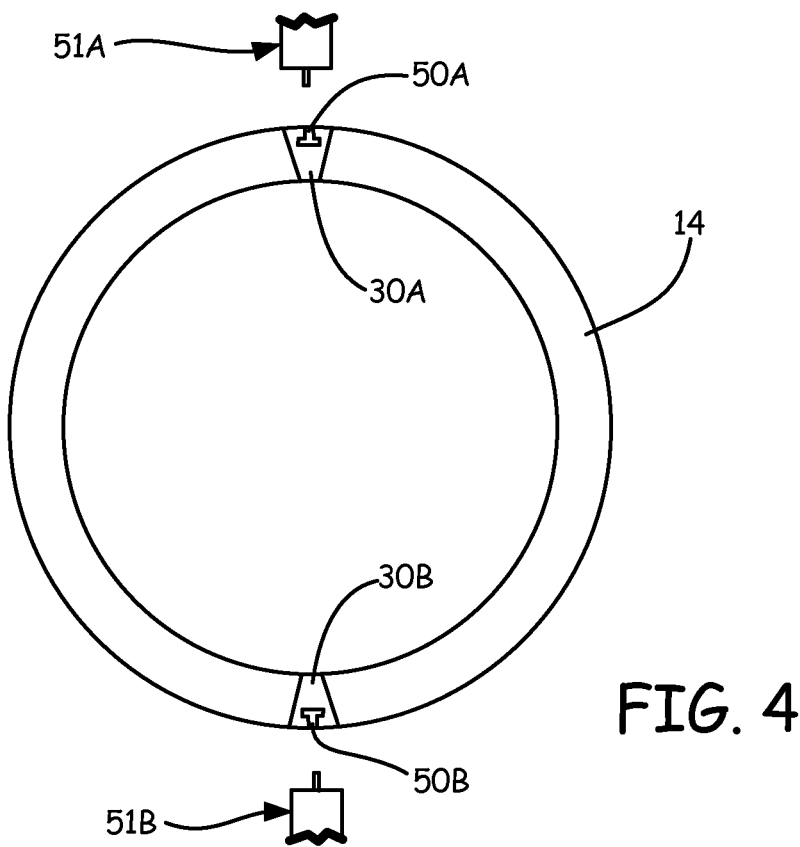
FIG. 4 is a sectional view showing a PTFE liner and conductive PTFE patch electrode, with a molded threaded insert in the patch electrode.

Electrical connection must be provided between patch electrode 30 and the exterior of pipe 12. This electrical connection can be provided in a number of different ways. FIG. 4 is a cross-sectional view of liner 14 and patch electrodes 30A and 30B, which are positioned 180° apart from one another.

In this embodiment, patch electrode 30A contains molded threaded insert 50A, and patch electrode 30B contains molded threaded insert 50B. When liner 14 is positioned within pipe 12 and patch electrodes 30A are aligned with electrode holes (or tunnels) through pipe 12, electrical connection to patch electrodes 30A, 30B can be made through an electrode extension pieces 51A, 51B that extend through the electrode holes and are threaded into inserts 50A and 50B, respectively.

Figure 5:
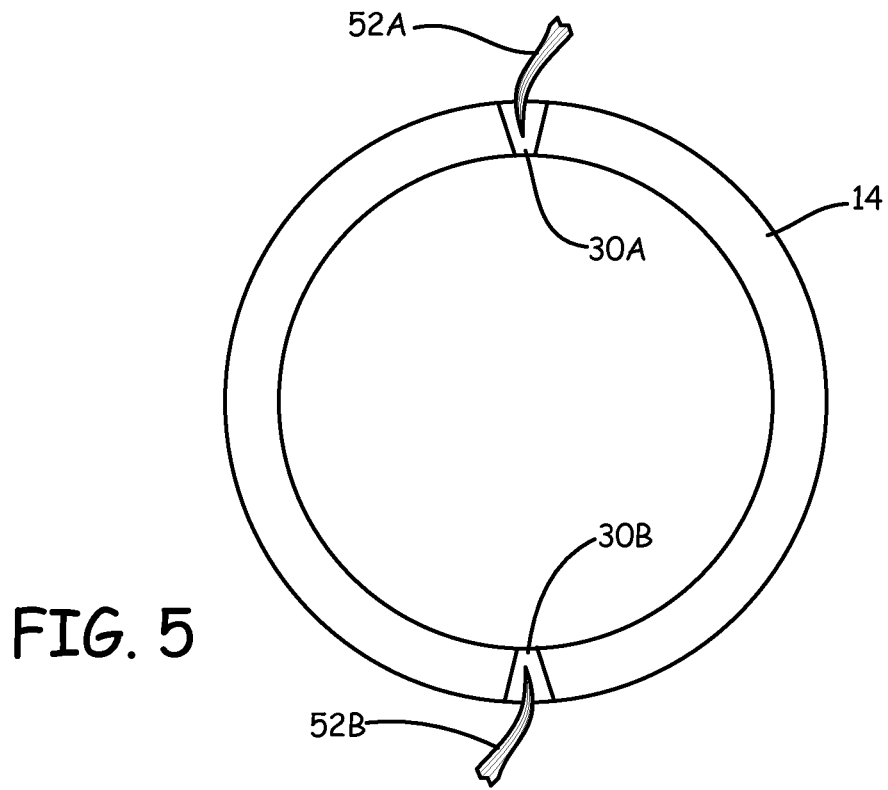
FIG. 5 is a sectional view of a PTFE liner and a conductive PTFE patch electrode, with a flexible circuit ribbon molded into the patch electrode.

FIG. 5 illustrates another embodiment. Flexible circuit ribbons 52A and 52B have one end molded into patch electrodes 30A and 30B, respectively. Flexible circuit ribbons 50A, 50B extend through the electrode holes in pipe 12 to provide electrical connection of electrode 30A and 30B, respectively.

Figure 6A:
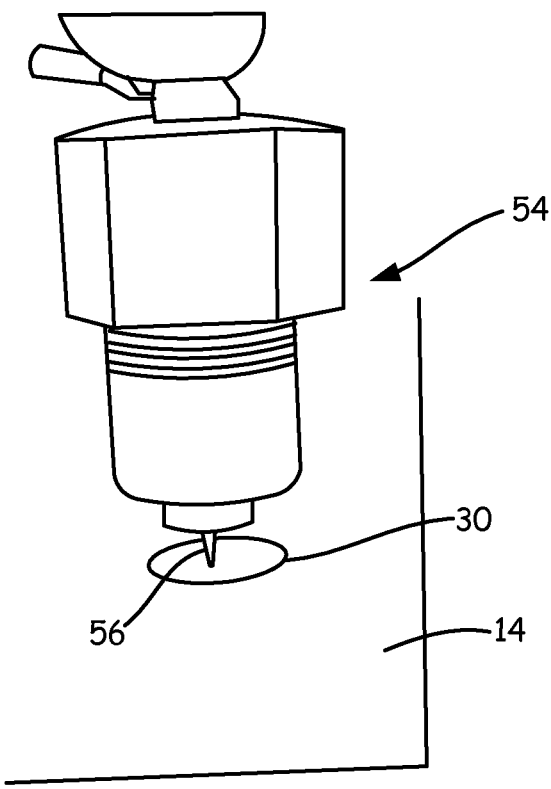
FIGS. 6A and 6B show a PTFE liner and a conductive PTFE patch electrode, with a spring loaded electrode extension contacting the patch electrode.
Figure 6B:
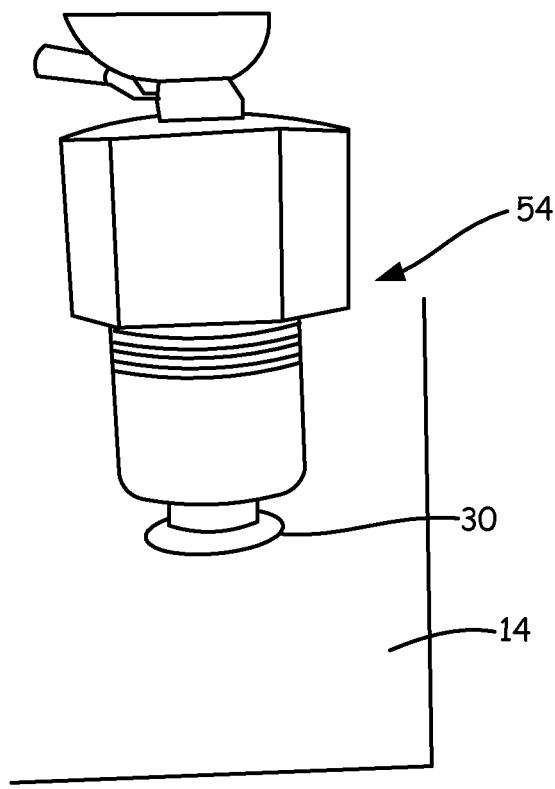

FIGS. 6A and 6B show another embodiment where electrode extension 54 includes spring loaded pin or probe 56 that makes contact with patch electrode 30. Pin 56 is visible in FIG. 6A, which shows the relative position of electrode extension 54, liner 14, and patch electrode 30 under low pressure/temperature conditions. FIG. 6B shows liner 14, patch electrode 30, and electrode extension 54 under high pressure/temperature conditions.

Although FIG. 6A shows electrode extension 54 with a single spring loaded pin (pin 56) other embodiments may use multiple spring loaded pins in order to increase contact area with patch electrode 30.

In order to make electrical contact with patch electrodes 30, there must be alignment between patch electrodes 30 and electrode holes or tunnels through the pipe. Before inserting liner 14 into pipe 12, a small area of PFA protective layer 44 over outer end 38 of patch electrodes 30A and 30B may be removed to enhance electrical connection between patch electrodes 30A and 30B and electrode extensions 54A and 54B.

The use of conductive PTFE patch electrodes bonded into holes in a non-conductive PTFE liner offers a number of important advantages. First, the PTFE patch electrodes mate with the liner so that the inner surface of the patch electrodes match the inner surface of the liner. This low profile electrode geometry means that flow is completely undisturbed. This creates less noise and improves flowmeter accuracy. Second, the conductive PTFE patch electrodes are bonded to the non-conductive PTFE liner to create an impermeable barrier to the process fluid flowing through the flowmeter. Together, the patch electrodes and the liner are virtually inseparable in terms of leakage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic flowmeter comprising:
   a pipe;
   a magnetic coil positioned adjacent an outer surface of the pipe;
   a non-conductive polytetrafluoroethylene (PTFE) liner on an inner surface of the pipe; and
   a conductive PTFE patch electrode bonded to the non-conductive PTFE liner so that an inner end of the patch electrode is exposed to an interior of the pipe and an outer end of the patch electrode is aligned with an electrode hole in the pipe.

2. The magnetic flowmeter of claim 1, wherein the PTFE patch electrode includes a molded threaded insert at the outer end.

3. The magnetic flowmeter of claim 2 and further comprising:
an electrode extension that extends through the electrode hole and is threaded into the molded threaded insert to provide electrical connection from the patch electrode to circuitry outside the pipe.

4. The magnetic flowmeter of claim 1 and further comprising:
a flexible electrical conductor having a first end molded into the patch electrode and extending through the electrode hole to a second end.

5. The magnetic flowmeter of claim 1, wherein the conductive PTFE patch electrode is bonded to the non-conductive PTFE liner by PFA.

6. The magnetic flowmeter of claim 1, wherein the conductive PTFE patch electrode has a resistance of less than 30 Kohms.

7. The magnetic flowmeter of claim 1, wherein a thin PFA skin bonded to the outer end of the patch electrode electrically insulates the patch electrode from the pipe.

8. The magnetic flowmeter of claim 1 and further comprising:
an electrode extension having a spring loaded probe in engagement with the patch electrode.

9. The magnetic flowmeter of claim 1, wherein the patch electrode has a frustoconical shape.

10. The magnetic flowmeter of claim 9, wherein the inner end of the patch electrode has a smaller diameter than the outer end.

11. A liner and electrode assembly for a magnetic flowmeter, the assembly comprising:
a non-conductive polytetrafluoroethylene (PTFE) liner; and
first and second conductive PTFE patch electrodes bonded to the non-conductive PTFE liner to form an integral PTFE tube with inner ends of the conductive PTFE patch electrodes matching an inner surface profile of the non-conductive PTFE liner.

12. The assembly of claim 11, wherein each PTFE patch electrode contains a molded threaded insert at the outer end.

13. The assembly of claim 12 and further comprising:
electrode extensions that are connected to the molded threaded inserts to provide electrical connection to the patch electrodes.

14. The assembly of claim 11 and further comprising:
flexible electrical conductors having ends molded into the patch electrodes.

15. The assembly of claim 11, wherein the conductive PTFE patch electrodes are bonded to the non-conductive PTFE liner by PFA.

16. The assembly of claim 11, wherein the conductive PTFE patch electrodes have a resistance of less than 30 Kohms.

17. The assembly of claim 11 and further comprising:
thin PFA skins bonded over outer ends of the patch electrodes.

18. The assembly of claim 11 and further comprising:
electrode extensions with a spring loaded probes for engagement with the patch electrodes.

19. The assembly of claim 11, wherein the patch electrode has a frustoconical shape.

20. The assembly of claim 19, wherein the inner end of the patch electrode has a smaller diameter than the outer end.

* * * * *